United States Patent
Charcranoon

(10) Patent No.: US 7,292,537 B2
(45) Date of Patent: Nov. 6, 2007

(54) MEASUREMENT ARCHITECTURE TO OBTAIN PER-HOP ONE-WAY PACKET LOSS AND DELAY IN MULTI-CLASS SERVICE NETWORKS

(75) Inventor: Saravut Charcranoon, Richardson, TX (US)

(73) Assignee: Alcatel Lucent, Paris (FR)

( * ) Notice: Subject to any disclaimer, the term of this patent is extended or adjusted under 35 U.S.C. 154(b) by 1053 days.

(21) Appl. No.: 10/307,133

(22) Filed: Nov. 29, 2002

(65) Prior Publication Data

US 2004/0105391 A1    Jun. 3, 2004

(51) Int. Cl.
*H04L 12/28* (2006.01)
*H04J 3/14* (2006.01)
*G06F 11/00* (2006.01)
*G08C 15/00* (2006.01)

(52) U.S. Cl. ............... 370/252; 370/229; 370/389; 709/224

(58) Field of Classification Search ........ 370/229–235, 370/241–253, 351–389; 709/223–224, 232–241
See application file for complete search history.

(56) References Cited

U.S. PATENT DOCUMENTS

| | | | | |
|---|---|---|---|---|
| 5,521,907 A * | 5/1996 | Ennis et al. | ........... | 370/253 |
| 5,793,976 A * | 8/1998 | Chen et al. | ........... | 709/224 |
| 6,112,236 A * | 8/2000 | Dollin et al. | ........... | 709/224 |
| 6,445,681 B1 * | 9/2002 | Pogrebinsky | ........... | 370/252 |
| 6,738,349 B1 * | 5/2004 | Cen | ........... | 370/231 |
| 6,751,663 B1 * | 6/2004 | Farrell et al. | ........... | 709/224 |
| 6,769,029 B1 * | 7/2004 | Seki et al. | ........... | 709/232 |
| 6,831,890 B1 * | 12/2004 | Goldsack et al. | ........... | 370/229 |
| 6,853,619 B1 * | 2/2005 | Grenot | ........... | 370/232 |
| 6,978,223 B2 * | 12/2005 | Milliken | ........... | 702/182 |
| 7,123,589 B1 * | 10/2006 | Dawes et al. | ........... | 370/248 |
| 2006/0077902 A1 * | 4/2006 | Kannan et al. | ........... | 370/250 |

FOREIGN PATENT DOCUMENTS

| | | |
|---|---|---|
| CA | 2200008 | 9/1998 |
| GB | 2 342 527 A | 4/2000 |
| GB | 2 355 901 A | 5/2001 |
| JP | 2000-196593 | 7/2000 |
| JP | 2001-053792 | 2/2001 |
| JP | 2001-069146 | 3/2001 |
| JP | 2001-127795 | 5/2001 |
| JP | 2001-148710 | 5/2001 |
| WO | WO 01/20825 A1 | 3/2001 |

OTHER PUBLICATIONS

Hofmann, et al.; One-Way-Delay Measurements with CM Toolset; IPCCC 2000; pp. 41-47.

(Continued)

*Primary Examiner*—Man U. Phan
(74) *Attorney, Agent, or Firm*—Craig A. Hoersten; Jessica W. Smith

(57) ABSTRACT

An architecture for measurement of per-hop, one-way delay includes a input observation circuit (24) at the input interface of a node (12) and a output observation circuit (26) at the output interface (16) of a node (12). The input observation circuit (24) copies and time stamps the headers of incoming packets, and filters packets according to an aggregate definition. Similarly, the output observation circuit (26) copies and time stamps the headers of outgoing packets, and filters packets according to the aggregate definition. The incoming and outgoing traces are correlated to calculate a delay measurement. A packet loss measurement uses input observation circuits (72a and 72b) at the input interfaces (14) of upstream and downstream nodes (20 and 22) and an output observation circuit 74 at the output interface (16) of the upstream node. The observation circuits (72a, 72b and 74) determine the number of lost packets across a node and between nodes, according to an aggregate definition.

10 Claims, 4 Drawing Sheets

OTHER PUBLICATIONS

Kata, et al.; Actiev Measurement and analysis of Delay Time in the Internet; Waseda University; Apr. 1, 1999.

Black, et al.; Per Hop Behavior Identification Codes: IETF Network Working Group; RFC 3140: Jun. 2001.

Nichols, et al.; Definition of the Differentiated Services Field (DS Field) in the IPv4 and IPv6 Headers; IETF Network Working Group; RFC 2474; Dec. 1998.

* cited by examiner

FIG. 10 — 100

| NODE ID | INPUT INTERFACE | OUTPUT INTERFACE | DSCP | SOURCE ADDRESS | DESTINATION ADDRESS | AGGREGATE SPECIFICATION | PACKET ID AND OFFSET | PACKET SIZE |

FIG. 11 — 102

| NODE ID | OUTPUT INTERFACE (UPSTREAM) | OUTPUT INTERFACE (DOWNSTREAM) | DSCP | SOURCE ADDRESS | DESTINATION ADDRESS | AGGREGATE SPECIFICATION | PACKET ID AND OFFSET | PACKET SIZE |

FIG. 12 — 104

| NODE ID | INPUT INTERFACE | OUTPUT INTERFACE | AGGREGATE SPECIFICATION | START TIME | STOP TIME | INTERVAL | PACKET LOSS COUNT |

FIG. 13 — 106

| UPSTREAM NODE ID | DOWNSTREAM NODE ID | INPUT INTERFACE | OUTPUT INTERFACE | AGGREGATE SPECIFICATION | START TIME | STOP TIME | INTERVAL | PACKET LOSS COUNT |

MEASUREMENT ARCHITECTURE TO OBTAIN PER-HOP ONE-WAY PACKET LOSS AND DELAY IN MULTI-CLASS SERVICE NETWORKS

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to a method and apparatus to obtain per-hop, one-way, packet loss and delay measurements in multi-class service networks.

2. Description of the Related Art

Per-hop, one-way, packet loss and delay measurements are useful in designing and maintaining a communications network. Such measurements can reveal if a piece of equipment is faulty, or not performing to specifications.

Existing solutions for delay measurements can be categorized as active measurement techniques or passive measurement techniques. Solutions based on an active measurement technique generate test packets or probes and inject them into the network. Some active measurement solutions measure a roundtrip delay and estimate a one-way delay by halving the result. Other solutions measure a one-way delay, which is more accurate. In all cases, the one-way active measurement requires a high-precision clock synchronization in order to determine the delay.

Solutions based on a passive measurement technique traditionally observe the time difference of a packet traversing between two points. These techniques, however, need to resolve a problem of clock synchronization between the two measurement engines, usually located at two different nodes. Some solutions approach the problem by employing a centralized synchonizaton or coordination system.

The major problem with the existing solutions is an ability to accommodate a large-scale deployment on a per-hop per-aggregate basis. They are either not cost effective or network resource usage effective in the case of active measurement based solutions. Meanwhile in the case of passive measurement based solutions, they either introduce excessive complexity or employ a centralized control that would restrict a scale of deployment and be a vulnerable spot.

The prior art has many shortcomings. First, the main problem with the roundtrip delay concerns with a well-known asymmetric route connecting two points in a network. Normally, the forward route takes a difference path from the backward route. This factor challenges a validity of halving a roundtrip delay in order to infer to a one-way delay.

Second, the one-way active measurement requires a clock synchronization between two measurement points that imposes a major burden on implementation and cost. It also impedes the solution from a large-scale deployment.

Third, the nature of an active measurement itself requires injecting overhead traffic into the network. Thus to measure a one-way per hop and per aggregate delay at each link in the network is a prohibitive task and very expensive. This is one of the main reasons that significantly lessen appropriateness in adopting these existing solutions.

Fourth, the major problem that prevents a passive measurement based approach from to be a viable and efficient solution is a need of clock synchronization between two nodes to obtain the delay. Various techniques have been proposed such as a centralized coordination or a GPS (Global Positioning System)-based clock synchronization system, but the usefulness is quite restricted to a small-scale deployment.

A similar problem is present with measuring packet loss. As in the case of measuring one-way delay, existing solutions can be categorized in two classes, active or network-based. Existing active measurement solutions are based on generating a test packet or probe such as ICMP Echo/Reply packets. Others are based on a one-way active measurement that requires a clock synchronization system in addition to injecting a test packet into a network. Network-based solutions use a network management system to collect information about a packet loss. For example, they employ SNMP to gather packet loss statistics from MIB (Management Information Base) that resides and is populated by the managed node or dedicated agents. Other may employ RMON (Remote Monitoring) probes or agents to collect packet loss statistics.

The major problem with the existing solutions is an ability to support a large-scale deployment on a fine-grained per-hop and per-aggregate basis. They are either not resource usage efficient or cost effective in the case of active measurement-based solutions. In the case of network management-based solutions, they lack a desired fine grained measurement support as well as are too complex for a large-scale deployment.

Specific problems with ICMP Echo/Reply packets include: (1)—an introduction of overhead traffic into a network, (2)—a requirement of ICMP support from a measurement nodes, (3) a lack of per-aggregate measurement support, and (4) an inability to measure a packet loss within a node. The major problem with a one-way active measurement are that these solutions need a synchronization or coordination between two measurement points in addition to imposing overhead traffic onto a network. These two drawbacks prevent this class of solutions from a large-scale deployment. Network-based solutions also have significant problems: (1) they rely on a node to support MIB in order to collect statistics; moreover, the current standard MIB does not provide per-aggregate statistics, (2) they offer less flexibility and controllability to configure and perform a packet loss measurement dynamically and on a on-demand basis, and (3) they do not support a measurement of packet loss within a node.

Accordingly, a need exists for an improved technique for measuring per-hop one-way delays and per-hop one-way packet loss in multi-class service networks.

BRIEF SUMMARY OF THE INVENTION

In the present invention, per-hop, one-way performance characteristics are measured in a packet-based network by defining an aggregate specification for specifying a type of packet to be included in a measurement, generating packet headers with associated timestamps for packets flowing through a first point and generating packet headers with associated timestamps for packets flowing through a second point. One or more performance measurements are calculated responsive to the timestamps associated with corresponding packet headers according to the aggregate specification.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 10 illustrates a record output from a first correlator;

FIG. 11 illustrates a record output from a second correlator;

FIG. 12 illustrates a nodal packet loss record; and

FIG. 13 illustrates a line packet loss record.

DETAILED DESCRIPTION OF THE INVENTION

The present invention is best understood in relation to FIGS. 1-13 of the drawings, like numerals being used for like elements of the various drawings.

Figure 1:
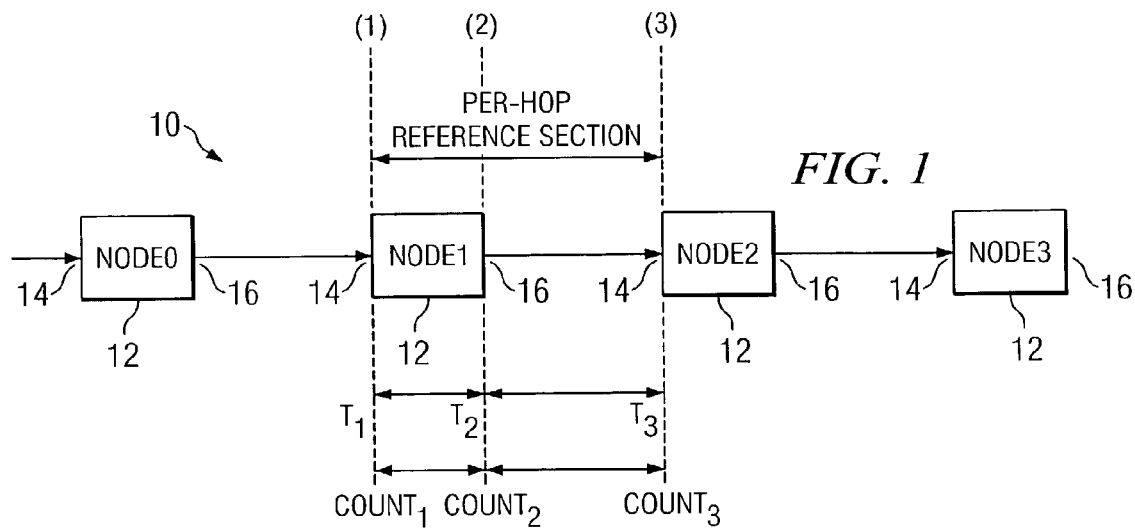
FIG. 1 illustrates a reference model for describing terms used in computing a per-hop one-way delay in a multi-class service network.

FIG. 1 illustrates a reference model for describing terms used in computing a per-hop one-way delay in a multi-class service network. FIG. 1 shows a network 10 with a plurality of network nodes 12 (shown individually as Node0, Node1, Node2 and Node3). In the illustrated embodiment, data flows sequentially through the nodes, arriving at each node's input interface 14 and departing at each node's output interface 16.

Looking specifically at Node1, a data packet arrives at the input interface of the node 12 at time $T_1$ and leaves at the output interface 16 of the node 12 at time $T_2$. At time $T_3$, the packet that was output from Node1 at time $T_2$ arrives at the input interface 14 of Node2.

The "Per-Hop Reference Section" is defined between two adjacent nodes with a unidirectional link connecting them. The reference starts from the input interface of the upstream node (i.e., point (1)), continues along and passes through the upstream node itself to its corresponding output interface. Finally, it terminates at the input interface of the adjacent downstream node (i.e., point (3)).

The "Per-Hop One-Way Delay" is defined as a time a packet taking to traverse from starting point of the per-hop reference (point (1)), to the terminating point of the reference (point (3)). It can be decomposed into two components the "Per-Hop One-Way Node Delay" and the "Per-Hop One-Way Line Delay".

The Per-Hop One-Way Node Delay (DelayNode) is the time spent by a packet to pass through the node including at least a queuing time, a processing time, and a routing and switching time. It can be expressed as, DelayNode=$T_2-T_1$, where $T_1$ is the time, a packet is observed at point (1) and $T_2$ is the time the same packet is observed at point 2.

The Per-Hop One-Way Line Delay (DelayLine) is the time spent by a packet to traverse the associated link. It includes at least a packet transmitting time and a propagation time. Mathematically, it is DelayLine=$T_3-T_2$, where $T_3$ is the time the same packet is observed at point (3).

The present invention, as it relates to per-hop one-way delay, uses a measurement based on the difference of time spent by a packet traversing from an input interface to the corresponding output interface of the same node, rather than on a measurement of a time difference spent between two nodes locating far apart. This eliminates a need for clock synchronization since a single clock system, i.e., the node clock, can perform the timing. Further, the measurements can be performed without generating any additional traffic into a network, using a passive measurement approach.

Figure 2:
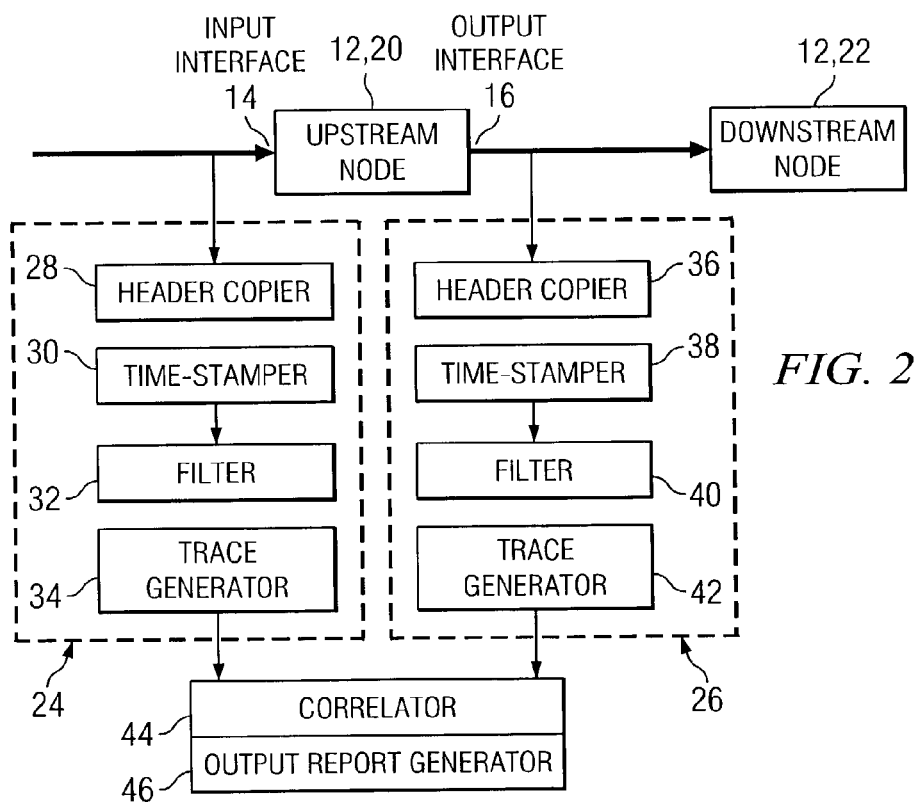
FIG. 2 illustrates a block diagram of a preferred embodiment of a circuit for measuring per-hop, one-way, delay between an upstream node and a downstream node.

FIG. 2 illustrates a block diagram of a preferred embodiment of a circuit for measuring per-hop, one-way, delay between an upstream node 20 and a downstream node 22. Input observation circuitry 24 is coupled to the input interface 14 of the upstream node 20, while output observation circuitry 26 is coupled to the output interface 16 of upstream node 20. Input observation circuitry 24 includes header copier 28, time stamper 30, filter 32 and trace generator 34. Output observation circuitry 26 includes header copier 36, time stamper 38, filter 40 and trace generator 42. The outputs of trace generators 34 and 42 are coupled to correlator 44. Output report generator 46 uses the results from correlator 44 to generate a report with the measurement data.

In operation, a passive measurement technique is used to collect packet header information from the passing-by packets—no artificial packets are injected into the stream of packets passing through upstream node 20. A flow definition is provided to specify which packets flowing through the upstream node 20 will be traced.

Figure 3:
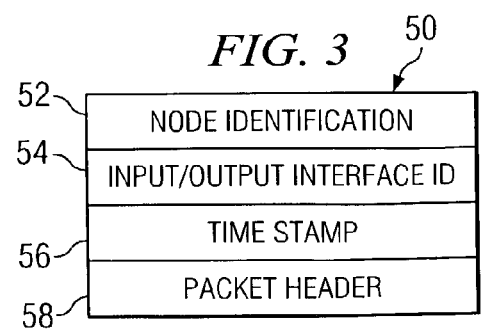
FIG. 3 illustrates a record output from header copier and time stamper circuits.

The header copier 28 of the input observation circuit 24 creates records of header information from either all packets or sample packets entering the node 20 at the input interface 14. Likewise, the header copier 36 of the output observation circuit 26 creates records of header information from either all packets or samples packets exiting the node 20 at the output interface 16. Time stampers 30 and 38 (coupled to the node's clock) add a current time field to each record indicating the time at which the packet reached the respective input interface 14 or output interface 16. An example record 50 is shown in FIG. 3. The record 50 includes a Node Identification field 52, Input/Output Interface ID field 54, Time Stamp field 56 and Packet Header 58.

Figure 4:
FIG. 4 illustrates an input trace record for a trace produced by an input trace generator for each packet in the aggregate.
Figure 5:
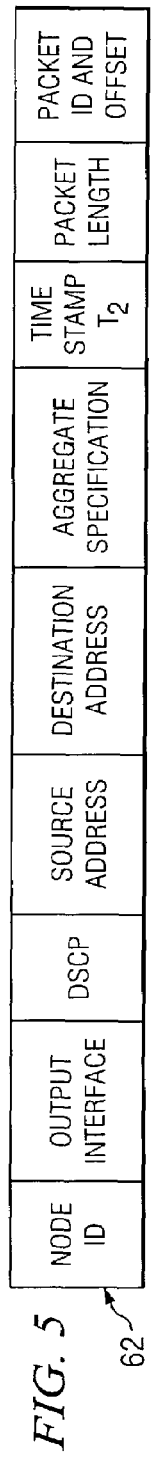
FIG. 5 illustrates an output trace record for a trace produced by an output trace generator for each packet in the aggregate.

Returning again to FIG. 2, the filters 32 and 40 receive the records from the respective time stampers 30 and 38. Filters 32 and 40 group packets in the defined aggregate, i.e., the packets that conform to the flow definition. The flow definition may include, for example, a DSCP (Differentiated Service Code Point), a source address, a destination address, or any combination of these parameters. Trace generators 32 and 40 create a trace of packet header records belonging to the defined aggregate. FIG. 4 illustrates an input trace record 60 for a trace produced by input trace generator 32 for each packet in the aggregate and FIG. 5 illustrates an output trace record 62 for a trace produced by output trace generator 40 for each packet in the aggregate. Input trace record 60 includes fields for a node ID, input interface ID, DSCP, source address, destination address, aggregate specification, time stamp ($T_1$), packet length and packet ID and offset. Output trace record 62 includes fields for a node ID, output interface ID, DSCP, source address, destination address, aggregate specification, time stamp ($T_1$), packet length and packet ID and offset. Other fields could be included for other parameters upon which the trace definition was based.

The correlator 44 matches the traces obtained from the input trace generator 34 and the associated output trace generator 42. It makes use of information from the forwarding routing table and configuration file to associate a packet entering at one input interface 14 to a packet leaving at an output interface 16. This is accomplished by checking the following:

same node ID,
same Src and Dest address,
same DSCP,
same aggregate specification (if multiple tests are performed simultaneously on a single stream),
same packet ID and the Offset is 0 (for IPv4),
same packet length or payload length,
a valid pair of input and output interfaces, considering from the routing information and the (Src addr, Dest addr).

Figure 6:
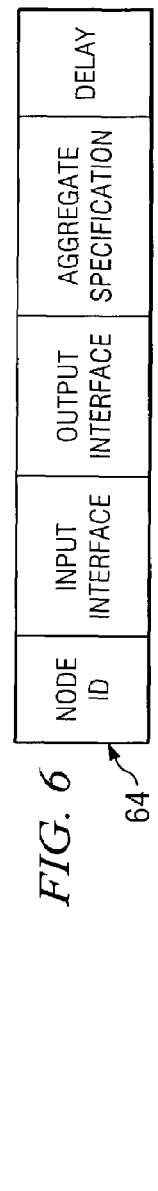
FIG. 6 illustrates the structure of a record produced by a correlator for each matched pair of incoming and outgoing packets.

FIG. 6 illustrates the structure of a record 64 produced by correlator 44 for each matched pair of incoming and outgoing packets. Record 64 includes fields for node ID, input interface, output interface, aggregate specification and computed delay.

The per-hop one-way delay is defined as a summation of a one-way nodal delay ($Delay_{Node}$) and a one-way line delay ($Delay_{Line}$). A per-hop and per aggregate delay ($Delay_{HD}$) is defined as the time that a packet of the underlying aggregate spends to traverse a per-hop reference section. Given an output record of underlying aggregate, the per-hop per aggregate nodal delay ($Delay_{NHD}$) and line delay ($Delay_{LHD}$) are defined as:

$$Delay_{NHD} = (T_2 - T_1)$$

$$Delay_{LHD} = (\text{Packet Length/Line Speed}) + \text{Propagation Time}$$

$$Delay_{HD} = Delay_{NHD} + Delay_{LHD}$$

where $T_1$ is the timestamp of a record produced at the input interface, $T_2$ is a timestamp of the matched record produced at the output interface and packet length is obtained from either of the two records.

This solution allows the most cost-effective, efficient, and scalable measurement of a per-hop and per-aggregate one-way delay to a large-scale deployment in a multi-class service network. First, the invention provides a per-hop and per-aggregate one-way delay where an aggregate level can be dynamically defined through a packet filter profile. Second, the invention provides a scalable solution, without imposing any overhead traffic onto a network. Third, the invention can be implemented simply, without high-precision clock synchronization. Fourth, the invention offers an economical and amicable solution for a large-scale deployment because it does not need a sophisticated clock synchronization system and particularly it does not generate additional traffic into a network. Fifth, the invention provides an accurate solution, without perturbing a network state during a measurement; thus, an obtained measurement truly reflects an actual network performance.

Referring again to FIG. 1, a second aspect of the invention is discussed—a measurement to obtain per-hop one-way packet loss in a multi-class service network. The Per-Hop Reference Section is the same as described above. "Per-Hop One-Way Packet Loss" is defined a number of packets lost during a certain time interval while traversing from the starting point (1) to the terminating point (3). It can be decomposed into two parts: Per-Hop One-Way Node Packet Loss ($PktLoss_{Node}$) and Per-Hop One-Way Line Packet Loss ($PktLoss_{Line}$). Per-Hop One-Way Node Packet Loss accounts for the number of packets dropped inside of a node and can be expressed as $PktLoss_{Node} = Count_2 - Count_1$, where $Count_1$ is number of packets that pass across point (1) and are destined for point (2), in a specified time interval and $Count_2$ is a portion of $Count_1$ that successfully reach point (2). Per-Hop One-Way Line Packet Loss ($PktLoss_{Line}$) accounts for packets dropped on a link connecting two adjacent nodes and can be defined as $PktLoss_{Line} = Count_3 - Count_2$.

As in the case of the per-hop one-way delay measurement described in connection with FIGS. 2-6, measuring the per-hop, one-way packet loss is performed by defining a flow as an aggregate of packets and employing a passive measurement technique to identify or filter only the packets that belong to the flow definition. Packets are observed at three points of a reference hop by gathering a trace of packets belonging to the flow at each of the points. Packets in the traces are then correlated to detect any missing packets in order to count a number of unsuccessfully transferred packets through the hop during a predefined time interval. The packet loss counts are then used to determine a per-hop packet loss of the flow.

Figure 7:
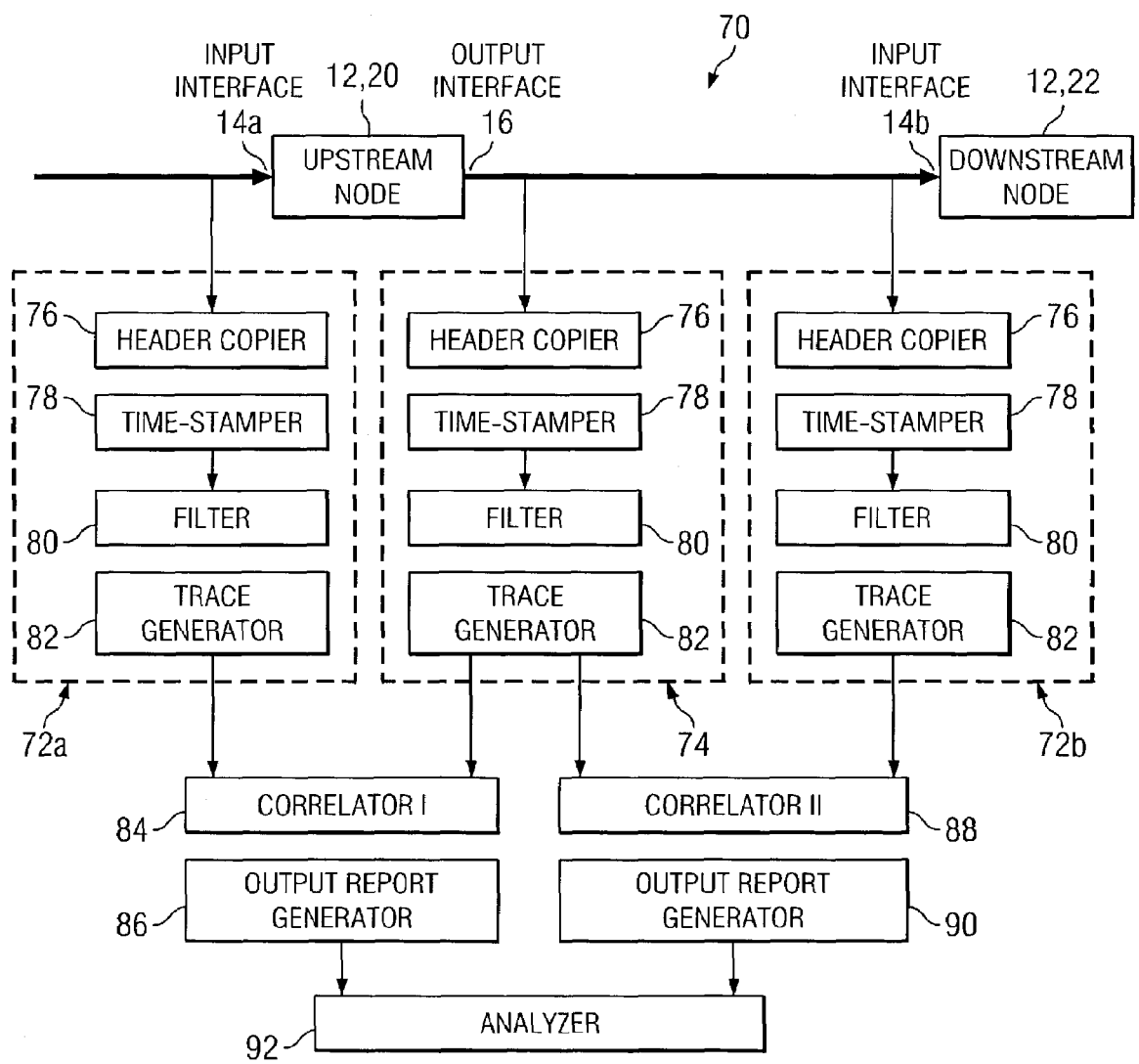
FIG. 7 shows a structure for per-hop one-way delay measurement between upstream node and downstream node 22

FIG. 7 shows a structure 70 for per-hop one-way delay measurement between upstream node 20 and downstream node 22. Input observation circuits 72a and 72b are coupled to the input interface 14a of the upstream node 20 and the input interface 14b of downstream node 22 and output observation circuitry 74 is coupled to the output interface 16 of upstream node 20. Input observation circuits 72a and 72b and output observation circuit 74 include header copier 76, time stamper 78, filter 80 and trace generator 82. The outputs of the trace generators 82 from input observation circuits 72a and output observation circuit 74 are coupled to a first correlator 84 and output report generator 86. The outputs of the trace generators 82 from input observation circuits 72b and output observation circuit 74 are coupled to a second correlator 88 and output report generator 90. The measurement data from the output report generators 86 and 90 is coupled to analyzer 92.

The header copiers 76 and time stampers 78 operate in the same manner as discussed in connection with FIGS. 2 and 3, creating records of header information from all packets entering (for input observation circuits 72a and 72b) or exiting a node (for output observation circuit 74) and adding a time field to each record. The records produced by header copiers 74 and time stampers 76 can be the same as shown in FIG. 3.

Figure 8:
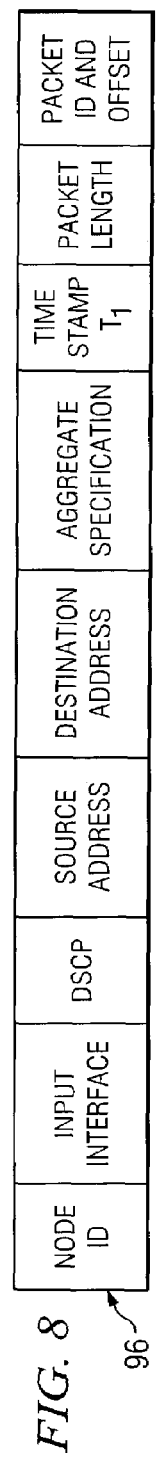
FIG. 8 illustrates an input trace record of a trace generator at an input interface.
Figure 9:
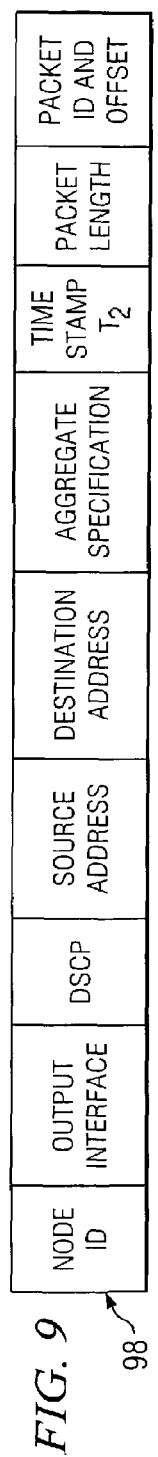
FIG. 9 illustrates a output trace record of a trace generator at the output interface of an upstream node.

Likewise, the filters 80 and trace generators 82 operate similarly to the filters and trace generators described above. Filters 80 perform classification by grouping the packet header records according to an aggregate specification. Trace Generators 82 create a trace of packet header records belonging to each aggregate. FIG. 8 illustrates an input trace record 96 of a trace generator 82 at an input interface (at both the upstream and downstream nodes) and FIG. 9 illustrates a output trace record 98 of a trace generator 82 at the output interface (of an upstream node). An aggregate can be specified by, for example, a DSCP, a source address, a destination address, or a combination of these parameters.

The correlators 84 and 88 match the traces obtained at the three observation points in order to produce a result report. They make use of the routing table information in order to associate a packet entering at one input interface to a packet leaving the upstream node output interface, as well as to associate a packet traversing from the upstream node output interface to the downstream node input interface. Each correlator 84 and 88 associates: (1) the node ID, (2) the interface, (3) source and destination addresses, (4) packet identification (for IPv4) and (5) the packet length or payload length. The output report generators 86 and 90 produce reports of the trace correlating. The first correlator output record 100, output from the first correlator 84, is shown in FIG. 10 and the second correlator output record 102, output from the second correlator 88, is shown in FIG. 11.

The per-hop, per-aggregate packet loss ($PktLoss_{HD}$) composes of two components: the nodal packet loss and the line packet loss. The per-hop, per-aggregate nodal packet loss ($PktLoss_{NHD}$) is a loss of packets of an underlying aggregate that traverse from the input interface to the corresponding output interface within a node. It may be a result of, for example, a buffer overflow or an error of packet header. The per-hop, per-aggregate line packet loss ($PktLoss_{LHD}$) is a loss of packets of an underlying aggregate on the link connecting two adjacent nodes. Accordingly, $PktLoss_{HD}=PktLoss_{NHD}+PktLoss_{LHD}$.

To compute $PktLoss_{NHD}$ in the first correlator 84 from the traces output by the trace generators of the input observation circuitry 72a and the output observation circuitry 74. First, a measurement interval, Interval, and a PktLossNode_Time_Threshold are defined. The first record in the input interface trace that matches the record of the trace from the output interface is located by checking for: (1) same node ID, (2) same source and destination addresses, (3) a valid pair of input and output interfaces, considering the routing information and the source and destination addresses, (4) same DSCP, (5) same aggregate specification (if multiple simultaneous tests are being performed), (6) same packet ID and offset=0 (for IPv4), and same (7) same packet length or payload length. Variables Start_time and Start_time_input are set to the Time Stamp in the input interface record. Start_time_output is set to the Time Stamp in the counterpart output interface record.

For every following record of the input interface trace with the Time Stamp not exceeding the (Start_time_input+ Interval), time_input is set to the corresponding Time Stamp, all similar attributes are checked, as given above, to see if there is a counterpart record from the output interface trace that has its Time Stamp not exceeding (time_input+PktLoss- Node_Time_Threshold). If there is no associated record from the output interface trace, the Node_Pkt_Loss counter is incremented. If there is an associated record with Time Stamp greater than (time_input+PktLossNode_Time_Th- reshold), then the Node_Pkt_Loss counter is incremented as well as deletion of the entry from the trace. When the Time Stamp of the input interface record is greater than the (Start_time_input+Interval), Stop_time is set to (Start_ time+Interval) and the nodal packet loss record 104 shown in FIG. 12 is generated.

$PktLoss_{LHD}$ is computed using a similar method. Start_ time, Interval, and Stop_time are set as above, PktLossLine_ Time_Threshold is defined. The record from the input interface trace of the downstream node that matches the first record from the output interface of the upstream node is located by checking all the followings attributes: (1) a valid pair of upstream and downstream node IDs, (2) same source and destination addresses, (3) same DSCP, (4) same aggregate specification (if multiple simultaneous tests are being performed), (5) same packet ID and the Offset is 0 (for IPv4), (6) same packet length or payload length, (7) a valid pair of input and output interfaces, considering from the routing information and the source and destination addresses. Start_time_upstream is set to the Time Stamp of the first output interface record of the upstream node and Start_time_downstream is set to the Time Stamp in the obtained counterpart input interface record of the downstream node.

For every following record of the output interface trace of the upstream node successfully obtained, all similar attributes are checked, as given above, to see if there is a counterpart record from the input interface trace of the downstream node that has the Time Stamp not exceeding (Start_time_downstream+PktLossLine_Time_Threshold). If there is no associated record from the output interface trace, the Line_PktLoss counter is incremented. If there is an associated record with Timestamp greater than (Start_time_ downstream+PktLossLine_Time_Threshold), then the Line_PktLoss counter is incremented. After the last record from the output interface trace of the upstream node is checked, the line packet loss record 106 shown in FIG. 13 is generated.

The analyzer 92 uses the nodal packet loss records 104 and line packet loss records 106 to determine a per-hop, per aggregate, one-way, packet loss. The analyzer 92 matches the attributes from these records, as shown in Table 1.

TABLE 1

Record Matching by Analyzer

| Nodal Packet Loss Record | Line Packet Loss Record |
|---|---|
| Node ID | Upstream Node ID |
| Output Interface | Output Interface |
| Aggregate Specification | Aggregate Specification |
| Start Time | Start Time |
| Stop Time | Stop Time |
| Interval | Interval |

For a pair of matched records, the $PktLoss_{HD}$ is computed from the summation of the values in the packet loss count fields of the records.

This solution allows the most cost-effective and scalable measurement of a per-hop and per-aggregate one-way packet loss for a network-wide deployment in a multi-class services network and provides many advantages over existing solutions. First, it provides a per-hop and per-aggregate one-way packet loss where an aggregate level can be dynamically defined through a packet filter profile. Second, it accommodates a wide range of aggregate level from per-source or destination IP address, network service class, or DSCP/PHB, to per ATM VPI/VCI or LSP. Third, it also accommodates an aggregation hierarchy. Since an aggregation is specified through a filter profile, it is thus flexible in changing an aggregate level to meet the on-demand requirement. Fourth, it provides a control on a temporal granularity of an obtained result. By explicitly specifying a collecting interval and time (interval time), various time scale results can be obtained for any time periods. Fifth, it provides an accurate result due to a passive measurement and does not inject additional traffic that may perturb the network. Sixth, it provides scalability of deployment due to a passive measurement technique. Seventh, it offers a cost-effective and simple solution for a large-scale deployment and does not require a complex clock or coordination system.

The embodiment of FIG. 7 could be used for both packet loss and delay measurements. The only necessary change would be to calculate the delay between input interface 14*a* and output interface 16 of the upstream node 20 for each of the filtered packets in the first correlator 84, and add this information to record 104 in order to pass this information to the analyzer 92.

It should be noted that in the structures of FIGS. 2 and 7, time stamping occurs prior to filtering. While filtering according to the aggregate specification could be performed prior to copying the header and time stamping, the time delay involved in filtering (and, specifically, the variation in the time delay in filtering at the different checkpoints) could reduce the accuracy of the time stamping.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A method of measuring per-hop, one-way performance characteristics in a packet-based network, comprising the steps of:
   defining an aggregate specification for specifying a type of packet to be included in a measurement;
   generating packet headers with associated timestamps for packets flowing through a first point;
   generating packet headers with associated timestamps for packets flowing through a second point;
   generating packet headers with associated timestamps for packets flowing through a third point; and
   calculating one or more performance measurements responsive to the timestamps associated with corresponding packet headers according to the aggregate specification.

2. The method of claim 1 and further comprising the step of filtering packet headers responsive to the aggregate specification.

3. The method of claim 1 wherein said first point is the input interface of a node and the second point is the output interface of the node and wherein said calculating step comprises the step of calculating a delay measurement.

4. The method of claim 1 and further comprising the step of filtering packet headers at said first, second and third points according to the aggregate specification.

5. The method of claim 1 wherein said first point is the input interface of a first node, the second point is the output interface of the first node, and the third point is the input interface of a second node and wherein said calculating step comprises the step of calculating a packet loss measurement.

6. Circuitry for measuring per-hop, one-way performance characteristics in a packet-based network, comprising:
   circuitry for generating packet headers with associated timestamps for packets flowing through a first point;
   circuitry for generating packet headers with associated timestamps for packets flowing through a second point;
   circuitry for generating packet headers with associated timestamps for packets flowing through a third point; and
   circuitry for calculating one or more performance measurements responsive to the timestamps associated with corresponding packet headers according to a predefined aggregate specification.

7. The circuit of claim 6 and further comprising circuitry for filtering packet headers responsive to the aggregate specification.

8. The circuit of claim 6 wherein said first point is the input interface of a node and the second point is the output interface of the node and wherein said calculating circuitry comprises circuitry for calculating a delay measurement.

9. The circuit of claim 6 and further comprising circuitry for filtering packet headers at said first, second and third points according to the aggregate specification.

10. The circuit of claim 6 wherein said first point is the input interface of a first node, the second point is the output interface of the first node, and the third point is the input interface of a second node and wherein said calculating circuitry comprises circuitry for calculating a packet loss measurement.

* * * * *